(12) United States Patent
Chan et al.

(10) Patent No.: US 8,430,349 B2
(45) Date of Patent: Apr. 30, 2013

(54) MASTER GEAR ASSEMBLY

(75) Inventors: Yik Hui Chan, Johor (MY); Bi Rong Law, Penang (MY); Meng Young Tea, Johor (MY)

(73) Assignee: Shimano Inc., Osaka (JP)

( * ) Notice: Subject to any disclaimer, the term of this patent is extended or adjusted under 35 U.S.C. 154(b) by 215 days.

(21) Appl. No.: 13/023,302

(22) Filed: Feb. 8, 2011

(65) Prior Publication Data
US 2011/0233316 A1 Sep. 29, 2011

(30) Foreign Application Priority Data

Mar. 24, 2010 (JP) ................................. 2010-067286

(51) Int. Cl.
*A01K 89/01* (2006.01)
(52) U.S. Cl.
USPC ............................ 242/249; 242/282; 242/283
(58) Field of Classification Search .................. 242/249, 242/257, 263, 282, 283
See application file for complete search history.

(56) References Cited

U.S. PATENT DOCUMENTS

| | | | |
|---|---|---|---|
| 6,102,315 A * | 8/2000 | Sato .............................. 242/249 |
| 6,394,380 B2 * | 5/2002 | Takikura ........................ 242/279 |
| 7,070,137 B2 * | 7/2006 | Nishikawa et al. ............ 242/282 |
| 2003/0205637 A1 * | 11/2003 | Nakajima et al. ............. 242/283 |
| 2004/0140385 A1 * | 7/2004 | Nishikawa et al. ............ 242/283 |
| 2010/0243781 A1 * | 9/2010 | Hayashi ........................ 242/224 |

FOREIGN PATENT DOCUMENTS

JP 3854732 B2 12/2006

OTHER PUBLICATIONS

Extended EP Search Report of corresponding EP Application No. 11 15 8954.5 dated Jul. 13, 2011.

* cited by examiner

*Primary Examiner* — Emmanuel M Marcelo
(74) *Attorney, Agent, or Firm* — Global IP Counselors, LLP

(57) ABSTRACT

A spinning reel master gear assembly is rotatably attachable to a reel unit of a spinning reel. The spinning reel master gear assemble includes a master gear shaft being rotatably attachable to the reel unit, and a master gear fixed to the master gear shaft in an integrally rotatable state. The master gear shaft includes an attachment portion. The attachment portion has a male threaded portion at least partially on an outer peripheral surface thereof. The master gear includes a female threaded portion screwed onto the male threaded portion, and a centered portion including an axis appropriately aligned by the attachment portion.

6 Claims, 5 Drawing Sheets

MASTER GEAR ASSEMBLY

CROSS-REFERENCE TO RELATED APPLICATIONS

This application claims priority to Japanese Patent Application No. 2010-067286 filed on Mar. 24, 2010. The entirety disclosure of Japanese Patent Application No. 2010-067286 is hereby incorporated herein by reference.

BACKGROUND OF THE INVENTION

1. Field of the Invention

The present invention relates to a gear assembly, and particularly to a master gear assembly rotatably attachable to a reel unit of a spinning reel.

2. Background Art

In the spinning reels, a master gear with face gear teeth is disposed concentric to the rotational axis of a handle. The master gear is disposed onto a master gear shaft that a handle shaft is engage therewith. The master gear meshes with a pinion gear that a rotor is fixed thereon. The master gear is configured to rotate the rotor by handle rotation. For example, specification of Japan Patent No. 3854732 describes a master gear of the aforementioned type. The master gear assembly includes a master gear and a master gear shaft as individual separate components.

In the master gear assembly of the well-known type, the master gear shaft includes a flanged portion for a gear attachment purpose. Specifically, the flanged portion is a large diameter portion for fixing the master gear thereon. The flanged portion includes a plurality of (e.g., six) through holes for allowing a plurality of (e.g., six) bolt members for a fixation purpose to penetrate therethrough. The master gear includes a plurality of (e.g., six) threaded holes on the rear surface thereof for allowing the bolt members to be screwed therein.

In assembling the master gear assembly of the well-known type, the master gear is fixed onto the master gear shaft by a plurality of the bolt members. Therefore, an operation of assembling the master gear assembly will be complex and requires a long period of time. Further, the flanged portion has a large outer diameter for attaching a plurality of the bolt members thereto. Therefore, the master gear assembly has a large mass and this makes it difficult to form the master gear assembly at lightweight.

SUMMARY OF THE INVENTION

In view of the above, the present invention addresses a need for producing a lightweight spinning reel master gear assembly that can be assembled in a short period of time.

A spinning reel master gear assembly is rotatably attachable to a reel unit of a spinning reel. The spinning reel master gear assemble includes a master gear shaft being rotatably attachable to the reel unit, and a master gear fixed to the master gear shaft in an integrally rotatable state. The master gear shaft includes an attachment portion. The attachment portion has a male threaded portion at least partially on an outer peripheral surface thereof. The master gear includes a female threaded portion screwed onto the male threaded portion, and a centered portion including an axis appropriately aligned by the attachment portion.

BRIEF EXPLANATION OF THE DRAWINGS

Referring now to the attached drawings which form a part of this original disclosure.

DETAILED DESCRIPTION OF THE EMBODIMENTS

Entire Structure

Figure 1:
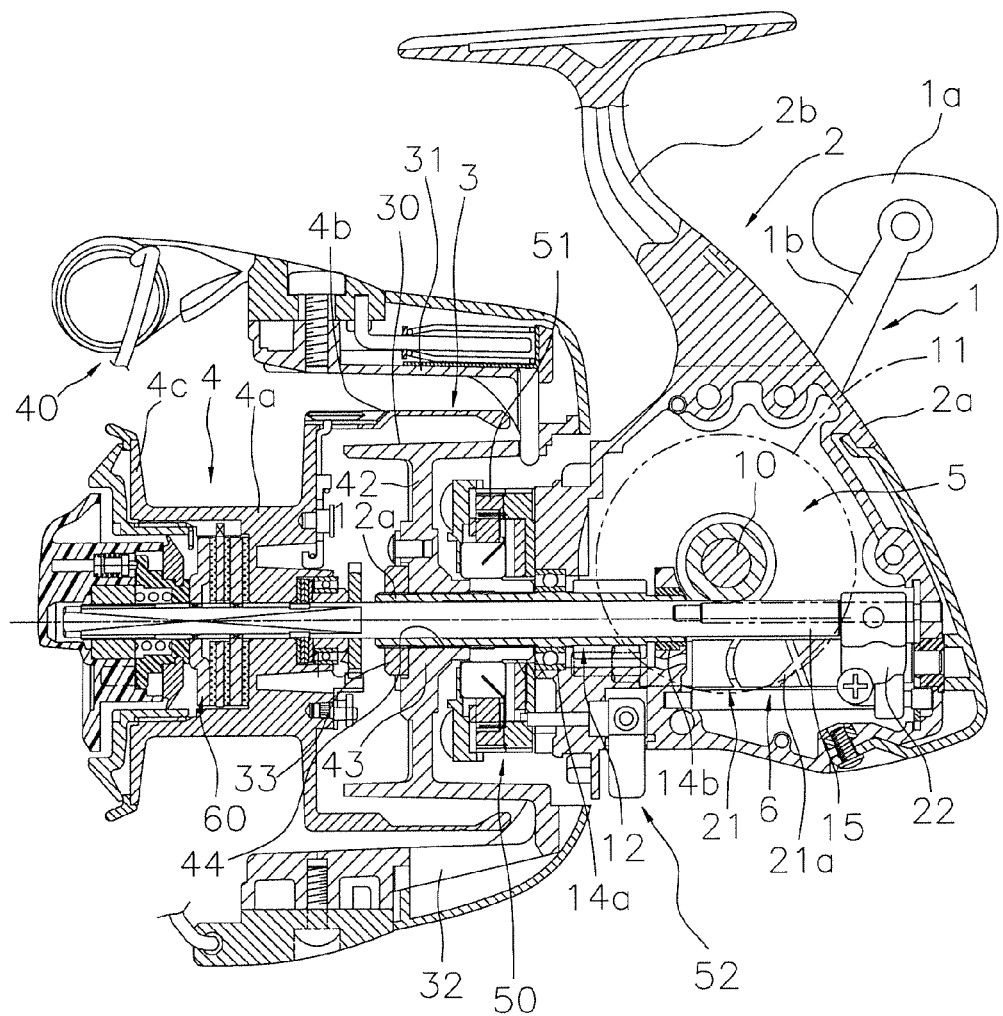
FIG. 1 is a cross-sectional side view of a spinning reel adopting an exemplary embodiment of the present invention.

As illustrated in FIG. 1, a spinning reel adopting an exemplary embodiment of the present invention is a large spinning reel for wrapping, for instance, a polyamide fishing line of roughly 0.47 mm in diameter and 200 meters in length thereon. The spinning reel includes a handle assembly 1, a reel unit 2, a rotor 3 and a spool 4. The reel unit 2 supports the handle assembly 1 while allowing it to rotate. The rotor 3 is rotatably supported at the front of the reel unit 2. The spool 4 is configured to wind the fishing line onto the outer periphery thereof. The spool 4 is disposed at the front of the rotor 3 while being allowed to move back and forth.

Figure 2:
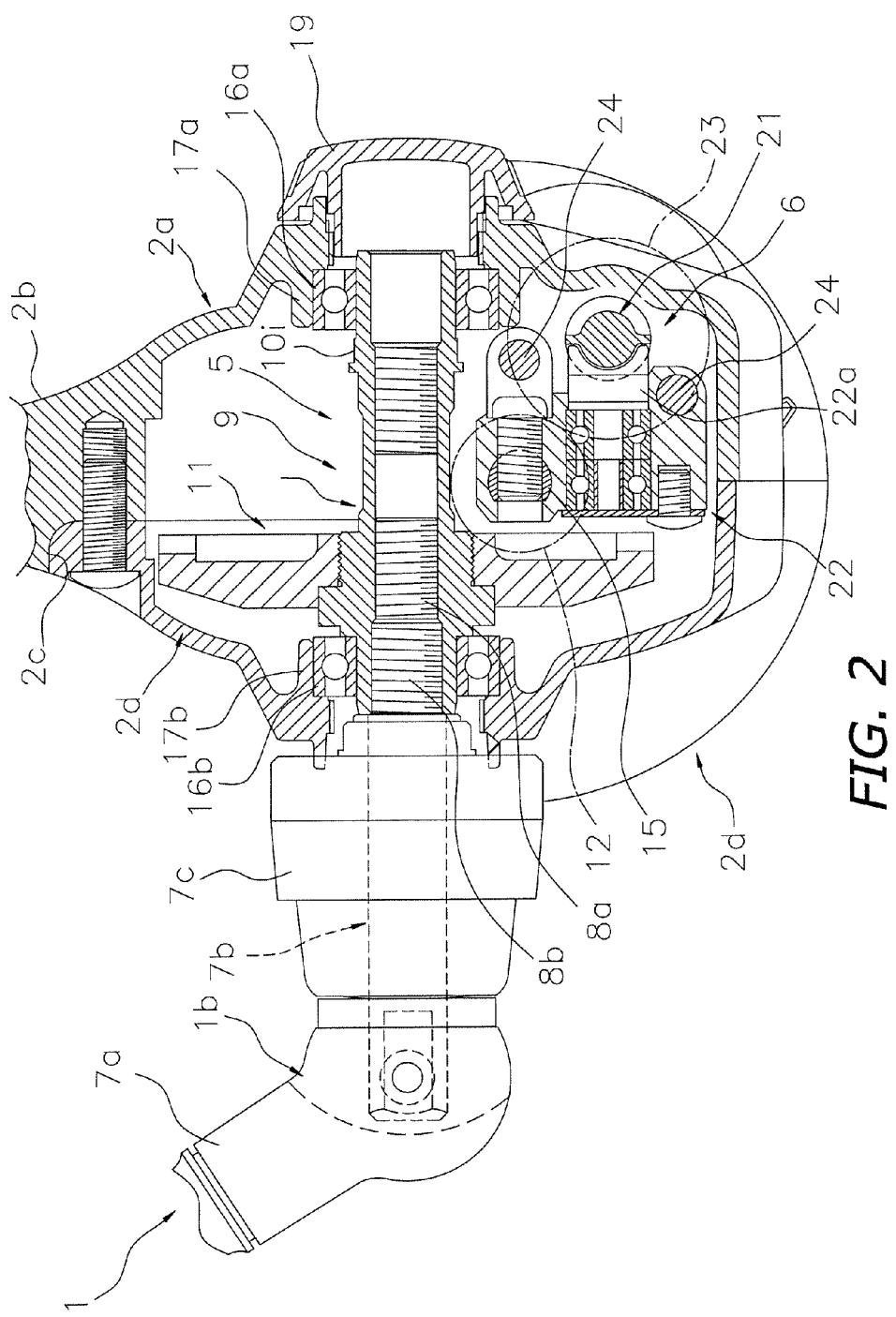
FIG. 2 is a cross-sectional rear view of the spinning reel.

As illustrated in FIGS. 1 and 2, the handle assembly 1, which is a member screwed onto a master gear shaft 10, is described. The handle assembly 1 includes a T-shaped knob portion 1a and an L-shaped crank arm 1b that the knob portion 1a is rotatably attached to the tip thereof. The crank arm 1b includes an arm portion 7a, a shaft portion 7b and a tubular member 7c. The base end of the arm portion 7a is pivotably attached to the shaft portion 7b. The tubular member 7c is a member for screwing the shaft portion 7b into the master gear shaft 10. The shaft portion 7b is a member having a rod-shaped cross-section. The shaft portion 7b includes a first male threaded portion 8a and a second male threaded portion 8b on the distal end thereof (i.e., the right-side end in FIG. 2). The first and second male threaded portions 8a, 8b are axially aligned and concentric to each other. The first threaded portion 8a functions as a right-handed screw configured to be tightened when rotated in the clockwise direction. The second threaded portion 8b has a diameter greater than that of the first male threaded portion 8a and functions as a left-handed screw configured to be tightened when rotated in the counterclockwise direction. Therefore, the handle assembly 1 can be attached to either the right lateral side of the reel unit 2 (see FIG. 1) or the left lateral side of the reel unit 2 (see FIG. 2).

Reel Unit Structure

The reel unit 2 includes a reel body 2a and a fishing rod attachment leg 2b. The reel body 2a includes an opening 2c on the lateral portion thereof. The fishing rod attachment leg 2b is a T-shaped portion integrally formed with the reel body 2a. The fishing rod attachment leg 2b is forwardly extended from the reel body 2a in an obliquely upward direction. The opening 2c is covered with a lid member 2d.

The reel body 2a includes a space for a mechanism attachment purpose in the inside thereof. The space communicates with the opening 2c and contains a rotor drive mechanism 5 and an oscillation mechanism 6. The rotor drive mechanism 5 is configured to rotate the rotor 3 in conjunction with rotation of the handle assembly 1. The oscillation mechanism 6 is configured to move the spool 4 back and forth for uniformly winding the fishing line onto the spool 4.

As illustrated in FIG. 2, the reel body 2a includes a tubular boss 17a on the right lateral side thereof. The boss 17a inwardly protrudes from the reel body 2a for containing a bearing 16a therein. The bearing 16a supports the right-side end of the master gear shaft 10. The lid member 2d includes a boss 17b being opposite to the boss 17a. The boss 17b inwardly protrudes from the lid member 2d for containing a bearing 16b therein. The bearing 16b supports the left-side end of the master gear shaft 10. One of the bosses 17a, 17b without attachment of the handle assembly 1 (e.g., the boss 17a in the case of FIG. 3) is sealed by a cap 19.

Rotor Drive Mechanism Structure

As illustrated in FIGS. 1 and 2, the rotor drive mechanism 5 includes a master gear assembly 9 and a pinion gear 12. The handle assembly 1 is fixedly attached to the master gear assembly 9. The pinion gear 12 meshes with the master gear assembly 9.

As illustrated in FIG. 2, the master gear assembly 9 includes the master gear shaft 10 and a master gear 11. The master gear 11 is fixed onto the master gear shaft 10 while being allowed to unitarily rotate therewith.

The master gear shaft 10 is a hollow member made of stainless. The both ends of the master gear shaft 10 are rotatably supported by the reel body 2a and the lid member 2d through the bearings 16a, 16b, respectively. The bearings 16a, 16b are both roller bearings having a corrosion-resistant property.

Figure 3:
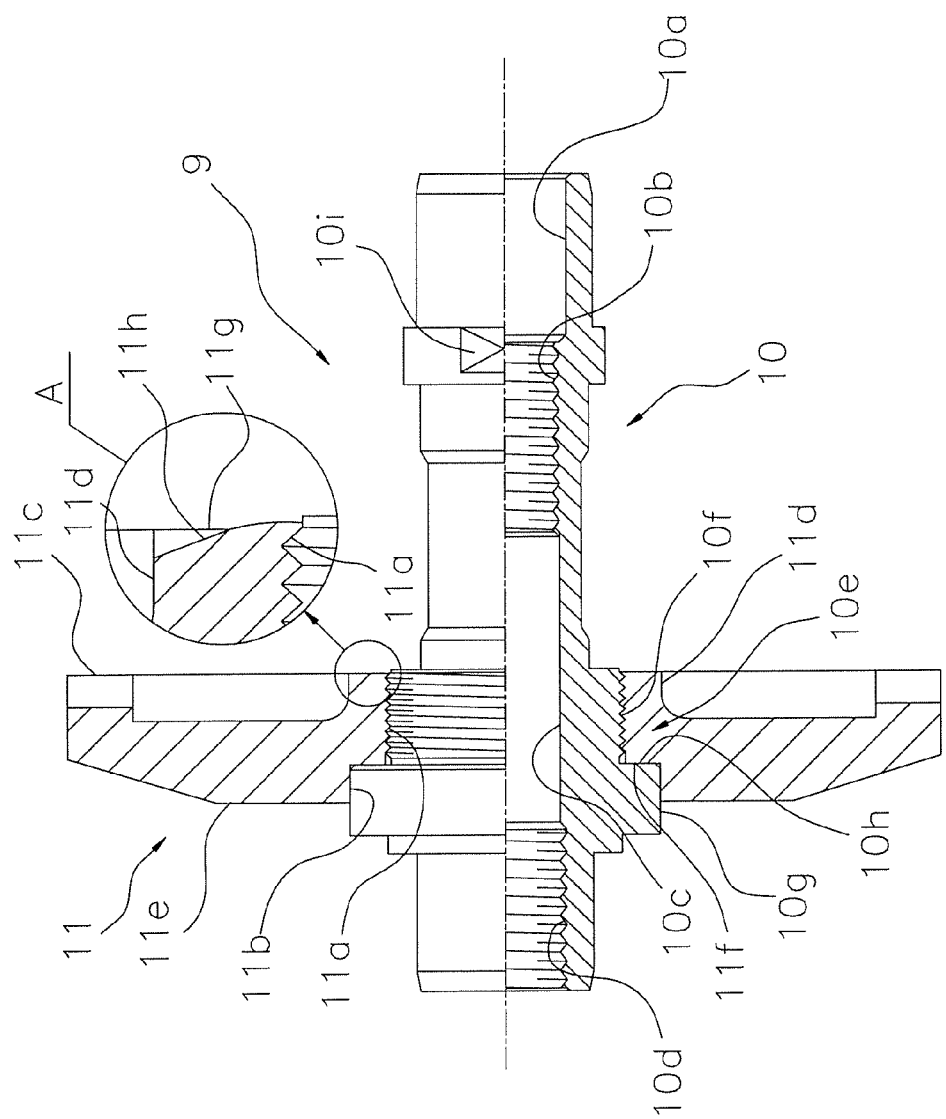
FIG. 3 is a side view of a master gear assembly that the radial half thereof is illustrated in a cross-sectional view.

As illustrated in FIG. 3, the master gear shaft 10 includes a first through hole 10a, a first female threaded portion 10b, a second through hole 10c and a second female threaded portion 10d on the center portion (i.e., the inner periphery) thereof. The first through hole 10a, the first female threaded portion 10b, the second through hole 10c and the second female threaded portion 10d opened to the left-side end of the master gear shaft 10 are axially aligned and concentric to each other in this order from the right-side end to the left-side end of the master gear shaft 10 (see also FIG. 4). The first through hole 10a has an axial length roughly the same as that of the second female threaded portion 10d. The first through hole 10a has a diameter greater than that of the second female threaded portion 10d for allowing the second male threaded portion 8b of the shaft portion 7b to penetrate therethrough. The first female threaded portion 10b functions as a right-handed screw to be screwed onto the first male threaded portion 8a of the shaft portion 7b. The first female threaded portion 10b has an axial length slightly greater than that of the first male threaded portion 8a. The second through hole 10c is formed between the first female threaded portion 10b and the second female threaded portion 10d. The second through hole 10c has a diameter greater than that of the first female threaded portion 10b for allowing the first male threaded portion 8a to penetrate therethrough. The second female threaded portion 10d functions as a left-handed screw to be screwed onto the second male threaded portion 8b of the shaft portion 7b.

Figure 4:
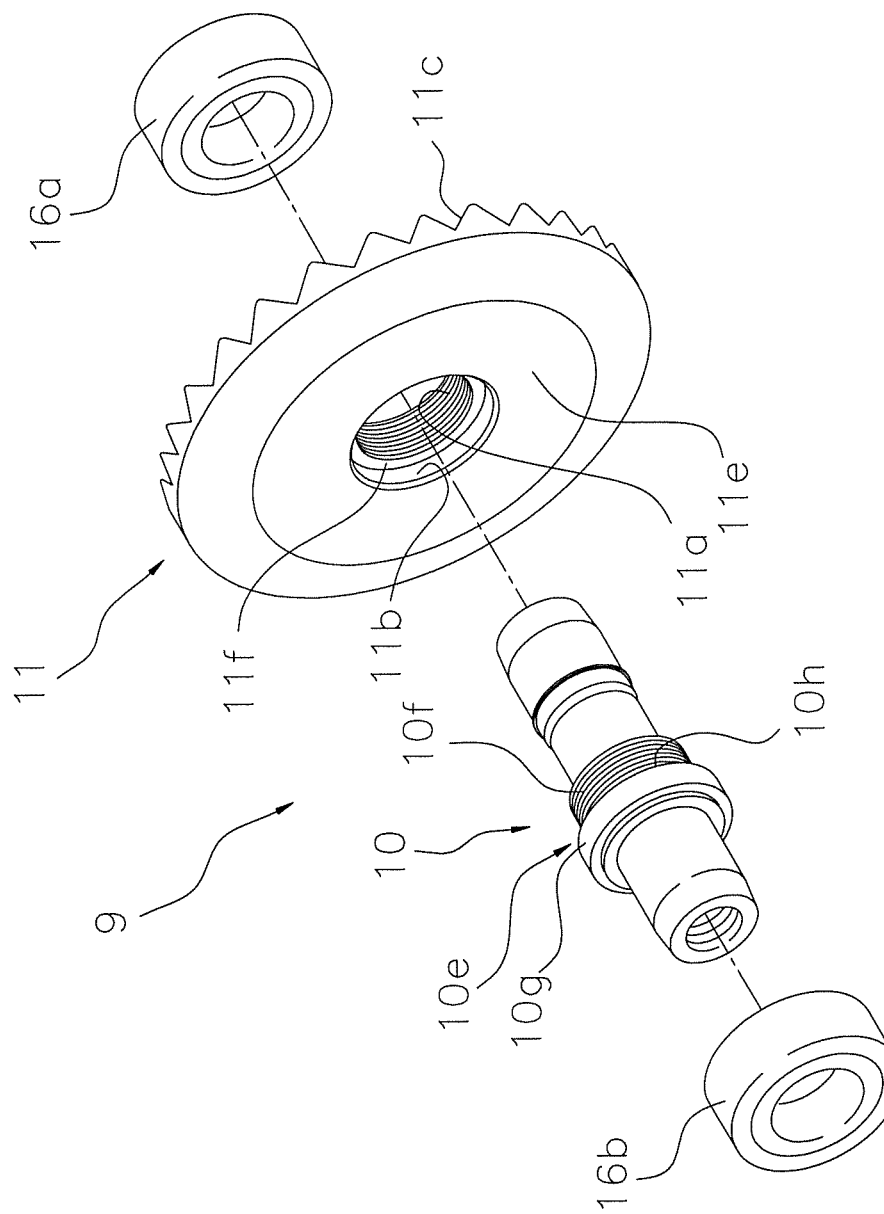
FIG. 4 is an exploded perspective view of the master gear assembly.

As illustrated in FIGS. 3 and 4, the master gear shaft 10 includes an attachment portion 10e on the outer peripheral surface thereof for attaching the master gear 11 thereon. The attachment portion 10e has a diameter greater than the diameters of the other portions of the master gear shaft 10. The attachment portion 10e includes a male threaded portion 10f, an centering portion 10g and a positioning surface 10h. The centering portion 10g is formed on the left side of the male threaded portion 10f as illustrated in FIG. 3. The centering portion 10g has a diameter greater than that of the male threaded portion 10f. The positioning surface 10h is a step between the male threaded portion 10f and the centering portion 10g. The male threaded portion 10f functions as a left-handed screw. Therefore, force is applied on the master gear 11 in a screw tightening direction when the master gear assembly 9 is rotated in the fishing line winding direction under the condition that load is applied to the rotor 3 in fishing. The master gear 11 is thus prevented from being loosened. Further, the master gear shaft 10 includes a tool lock portion 10i on the outer peripheral surface thereof. The tool lock portion 10i is disposed away from the attachment portion 10e. The tool lock portion 10i includes a pair of parallel faces. The tool lock portion 10i is rotated while being locked by a tool for screwing the master gear shaft 10 into the master gear 11.

The master gear 11 is a disc member made of aluminum forging alloy for forming it at lightweight. The master gear 11 includes a female threaded portion 11a and a centered portion 11b. The female threaded portion 11a is screwed onto the male threaded portion 10f. The centered portion 11b makes contact with the centering portion 10g of the attachment portion 10e, and the axis thereof is thereby appropriately aligned. Further, the master gear 11 includes a gear portion 11c, a tubular portion 11d and a disc portion 11e. The gear portion 11c including face gear teeth is formed on the outer radial portion of the lateral surface of the master gear 11. The tubular portion 11d includes the female threaded portion 11a on the inner peripheral surface thereof. The disc portion 11e connects the gear portion 11c and the tubular portion 11d. The gear portion 11c meshes with the pinion gear 12. The tubular portion 11d protrudes to the same side as the gear portion 11c. The master gear 11 further includes an abutment surface 11f between the female threaded portion 11a and the centered portion 11b. The abutment surface 11f is abutted to the positioning surface 10h for appropriately setting the axial position of the master gear 11.

As illustrated in an enlarged view A of FIG. 3, an anti-rotation portion 11h is formed on an end surface 11g protruding opposite to the abutment surface 11f in the axial direction of the female threaded portion 11a. After the master gear assembly 9 is assembled, the anti-rotation portion 11h is formed by conducting clinching for the end surface 11g. In other words, the anti-rotation portion 11h is formed by pressing the end surface 11g using a punch for deforming it. Clinching is herein conducted for a plurality of (e.g., two to six) positions circumferentially separated at predetermined intervals on the end surface 11g. The master gear 11 is accordingly tightly fixed to the attachment portion 10e of the master gear shaft 10 by clinching. In other words, the master gear 11 is prevented from rotating with respect to the master gear shaft 10. Further, the master gear 11 is bonded to the master gear shaft 10 by adhesive material applied onto the male threaded portion 10f in assembling the master gear assembly 9.

When the master gear assembly 9 of the aforementioned structure is assembled, the adhesive material is firstly applied onto the male threaded portion 10f. Under the condition, the master gear shaft 10 is inserted into the master gear 11 from the rear surface thereof (i.e., the left-side surface in FIG. 2) and the tip thereof is accordingly protruding out of the right-side surface of the master gear 11. Next, the tool lock portion 10i of the master gear shaft 10 is locked by a tool. Under the condition, the master gear shaft 10 is rotated for screwing into the master gear 11. The master gear 11 is thus attached onto the master gear shaft 10. Under the condition, a clinching operation is conducted for the end surface 11g of the tubular portion 11d of the master gear 11. Specifically, the end surface 11g is pressed and deformed by a suitable clinching tool while being set in a press machine and the like. The master gear 11 is thereby tightly fixed to the master gear shaft 10 by clinching and is thereby prevented from rotating. The assembling operation of the master gear assembly 9 is completed with the clinching operation.

As illustrated in FIG. 1, the pinion gear 12 is a tubular member disposed along a back-and-forth direction of the spinning reel. The pinion gear 12 is rotatably attached to the reel body 2a. A front end 12a of the pinion gear 12 penetrates the center portion of the rotor 3. The front end 12a is fixed to the rotor 3 by a nut 33 in the penetration position. The axial intermediate portion of the pinion gear 12 is supported by the reel body 2a through a first bearing 14a, whereas the axial rear portion thereof is supported by the reel body 2a through a second bearing 14b. Accordingly, the pinion gear 12 is rotatably supported by the reel body 2a. A spool shaft 15 penetrates through the inner periphery of the pinion gear 12. The pinion gear 12 meshes with the master gear 11 and simultaneously meshes with the oscillation mechanism 6.

Rotor Structure

As illustrated in FIG. 1, the rotor 3 includes a cylindrical portion 30, a pair of a first rotor arm 31 and a second rotor arm 32, and a bail arm 40. The cylindrical portion 30 is fixed to the pinion gear 12. The first and second rotor arms 31, 32 are disposed lateral to the cylindrical portion while being opposed to each other. The bail arm 40 is configured to guide the fishing line onto the spool 4. The cylindrical portion 30, the first rotor arm 31, and the second rotor arm 32 are integrally formed and made of, for instance, aluminum alloy. As described above, the center portion of the tip of the cylindrical portion 30 is fixed onto the front end 12a of the pinion gear 12 by the nut 33 while being unitarily rotatable therewith. The bail arm 40 configured to wind the fishing line onto the spool 4 is attached to the tip of the first rotor arm 31 and the tip of the second rotor arm 32 while being allowed to pivot between the fishing line winding position and the fishing line release position.

The cylindrical portion 30 includes a front wall 42 in the front portion thereof. The front wall 42 includes a boss 43 in the center portion thereof. The boss 43 includes a through hole 44 in the center portion thereof. The through hole 44 is engaged with the pinion gear 12 while being unitarily rotatable therewith. The spool shaft 15 and the front end 12a of the pinion gear 12 penetrate the through hole 44.

An anti-reverse mechanism 50 is disposed in the inside of the cylindrical portion 30 while being adjacent to the boss 43. The anti-rotation mechanism 50 includes a one-way clutch 51 and a switch mechanism 52. The one-way clutch 51 is a roller clutch including a freely rotatable inner race fixedly attached to the pinion gear 12. The switch mechanism 52 is configured to switch the one-way clutch 51 between an activation state (i.e., a reverse prevention state) and a deactivation state (i.e., a reverse permission state).

Oscillation Mechanism Structure

As illustrated in FIGS. 1 and 2, the oscillation mechanism 6 includes a traverse cam shaft 21, a slider 22, and an intermediate gear 23 (see FIG. 2). The traverse cam shaft 21 is disposed in parallel to and approximately right below the spool shaft 15. The slider 22 is configured to move back and forth along the traverse cam shaft 21. The intermediate gear 23 is fixed to the distal end of the traverse cam shaft 21. The slider 22 is movably supported by two guide shafts 24 (see FIG. 2) disposed in parallel to the traverse cam shaft 21. An engagement member 22a is attached to the inside of the slider 22. The engagement member 22a is engaged with intersecting helical grooves 21a formed on the outer peripheral surface of the traverse cam shaft 21. The rear end of the spool shaft 15 is fixed to the slider 22. The intermediate gear 23 meshes with the pinion gear 12.

Spool Structure

As illustrated in FIG. 1, the spool 4 is disposed between the first and second rotor arms 31, 32 of the rotor 3. The center portion of the spool 4 is coupled to the distal end of the spool shaft 15 through a drag mechanism 60. The spool 4 includes a bobbin trunk 4a, a skirt 4b, and a front flange 4c. The bobbin trunk 4a allows the fishing line to be wound around the outer periphery thereof. The skirt 4b disposed behind the bobbin trunk 4a is integrally formed with the bobbin trunk 4a. The front flange 4c is disposed on the front end of the bobbin trunk 4a. The bobbin trunk 4a is a cylindrical member and the outer peripheral surface thereof is disposed in parallel to the spool shaft 15.

Operation and Actions of Reel

According to the spinning reel of the present exemplary embodiment, the bail arm 40 is pivoted down to the fishing line release position for releasing the fishing line, for instance, in casting. The fishing line is thereby sequentially reeled out from the tip of the spool 4 weight of a tackle.

The bail arm 40 is returned to the fishing line winding position in winding the fishing line. This is automatically done by a bail tripping mechanism (not illustrated in the figure) in conjunction with rotation of the handle assembly 1 in the fishing line winding direction. Torque of the handle assembly 1 is transmitted to the pinion gear 12 through the master gear shaft 10 and the master gear 11. The torque transmitted to the pinion gear 12 is transmitted to the rotor 3 from the front portion of the pinion gear 12 while being transmitted to the oscillation mechanism 6 through the intermediate gear 23 meshing with the pinion gear 12. Consequently, the rotor 3 is rotated in the fishing line winding direction and the spool 4 is reciprocated back and forth.

Even if a fish is caught in winding the fishing line and load is applied on the rotor 3, screw tightening force is applied on the master gear 11 because the male threaded portion 10f and the female threaded portion 11a both function as left-handed screws. Accordingly, the master gear 11 is prevented from being loosened.

Features (A) The master gear assembly 9 is an assembly rotatably attachable to the reel unit 2 of the spinning reel. The master gear assembly 9 includes the master gear shaft 10 and the master gear 11. The master gear shaft 10 includes the attachment portion 10e having the male threaded portion 10f at least partially on the outer peripheral surface thereof. Further, the master gear shaft 10 is rotatably attachable to the reel unit 2. The master gear 11 is fixed to the master gear shaft 11 while being unitarily rotatable therewith. The master gear 11 includes the female threaded portion 11a and the centered portion 11b. The female threaded portion 11a is screwed onto the male threaded portion 10f. The axis of the centered portion 11b is appropriately aligned by the attachment portion 10e.

In assembling the master gear assembly 9, the master gear 11 is attached onto the attachment portion 10e of the master gear shaft 10. Accordingly, the axis of the master gear 11 is appropriately aligned by the master gear shaft 10. Under the condition, the female threaded portion 11a of the master gear 11 is screwed onto the male threaded portion 10f formed on the attachment portion 10e. The master gear 11 is thereby fixed to the master gear shaft 10. As described above, the master gear 11 is fixed to the master gear shaft 10 by screwing the master gear 11 directly onto the master gear shaft 10. Therefore, the master gear assembly 9 can be assembled in a short period of time. In addition, the attachment portion 10e is only required to have the male threaded portion 10f to be screwed into the female threaded portion 11a. The attachment portion 10e can be therefore formed in a small outer diameter. In other words, the master gear shaft 10 can be lightweight. Consequently, the entire master gear assembly 9 can be lightweight.

(B) In the master gear assembly 9, the attachment portion 10e has a diameter greater than that of the male threaded portion 10f. Further, the attachment portion 10e includes the centering portion 10g and the positioning surface 10h. The centering portion 10g is axially aligned with the male threaded portion 10f. The centering portion 10g is engaged with the centered portion 11b for appropriately aligning the axis of the master gear 11. The positioning surface 10h is disposed between the male threaded portion 10f and the centering portion 10g while being disposed perpendicular to the axial direction. The centered portion 11b is a centering hole contactable with the outer peripheral surface of the centering portion 10g. The master gear 11 further includes the abutment surface 11f abutted to the positioning surface 10h.

In this case, the centered portion 11b has a diameter greater than the diameter of the female threaded portion 11a. Therefore, the female threaded portion 11a is formed in a through hole shape. The female threaded portion 11a can be thereby easily formed. Further, the axial position of the master gear 11 can be accurately positioned by the positioning surface 10h that is a step between the small-diameter male threaded portion 10f and the centering portion 10g. Therefore, the master gear assembly 9 can further accurately mesh with the pinion gear 12 with use of the positioning surface 10h.

(C) The master gear 11 further includes the anti-rotation portion 11h for preventing the master gear 11 from rotating with respect to the master gear shaft 10. In this case, the master gear 11 is prevented from rotating. Therefore, the master gear 11 is prevented from being detached from the master gear shaft 10 when the master gear 11 is screwed and fixed onto the master gear shaft 10.

(D) In the master gear assembly 9, the master gear 11 includes the gear portion 11c, the tubular portion 11d, and the disc portion 11e. The gear portion 11c, including the face gear teeth, is formed on the outer radial portion of the lateral surface of the master gear 11. The tubular portion 11d includes the female threaded portion 11a on the inner peripheral surface thereof. The disc portion 11e connects the tubular portion 11d and the gear portion 11c. The anti-rotation portion 11h is formed by clinching for the female-threaded-portion directional end surface 11g of the tubular portion 11d. Specifically, the anti-rotation portion 11h is herein formed by pressing a plurality of circumferential positions on the female-threaded-portion directional end surface 11g of the tubular portion 11d by a clinching shaft, for example. Therefore, the master gear 11 can be prevented from rotating by an easy clinching operation without using an anti-rotation member such as a lock nut or a retainer ring.

(E) In the master gear assembly 9, the male threaded portion 10f and the female threaded portion 11a both function as left-handed screws. In this case, force normally is applied on the female threaded portion 11a in a screw tightening direction when a fish is caught and the handle is rotated in the fishing line winding direction. Therefore, the master gear 11 is prevented from being easily loosened with respect to the master gear shaft 10 when the master gear 11 is screwed onto the master gear shaft 10. Accordingly, the master gear 11 can be further reliably prevented from rotating.

(F) In the master gear assembly 9, the master gear 11 is fixed to the master gear shaft 10 by adhesive material. Therefore, the master gear 11 is further reliably prevented from rotating by fixing the master gear 11 to the master gear shaft 10 by adhesive material.

Other Exemplary Embodiments

One of the exemplary embodiments of the present invention has been described above. However, the present invention is not limited to the aforementioned exemplary embodiment. A variety of changes can be made for the present invention without departing from the scope of the present invention.

Figure 5:
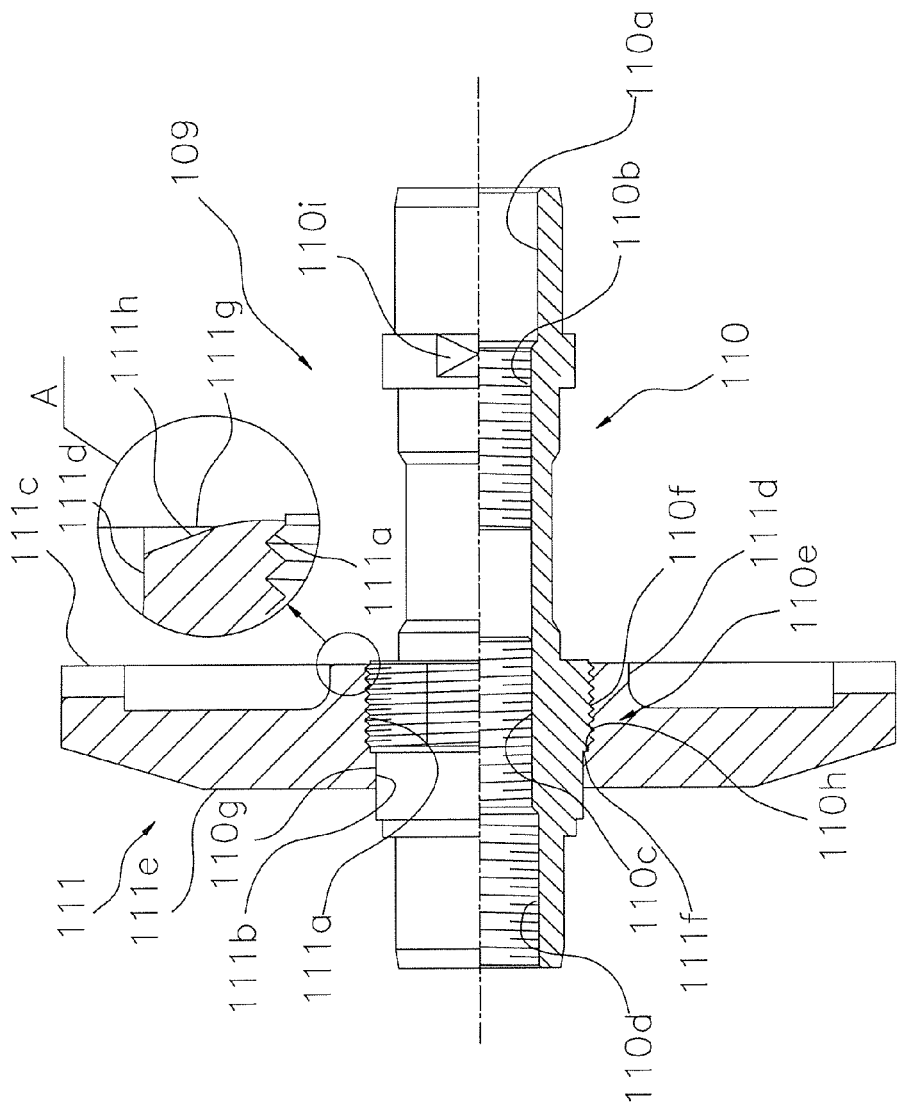
FIG. 5 is a diagram corresponding to FIG. 3, illustrating a side view of a master gear assembly of another exemplary embodiment that the radial half thereof is illustrated in a cross-sectional view.

(a) In the aforementioned exemplary embodiment, the master gear shaft 10 is attached to the master gear 11 from the rear surface of the master gear 11 in assembling the master gear assembly 9. However, the method of attaching the master gear shaft 10 to the master gear 11 is not limited to the above. As illustrated in FIG. 5, a master shaft 110 may be attached to a master gear 111 from the same side as a gear portion 111c.

As illustrated in FIG. 5, similarly to the aforementioned exemplary embodiment, the master gear shaft 110 of a master gear assembly 109 includes a first through hole 110a, a first female threaded portion 110b, a second through hole 110c, and a second female threaded portion 110d on the inner peripheral surface thereof. The first through hole 110a, the first female threaded portion 110b, the second through hole 110c and the second female threaded portion 110d opened to the left end are axially aligned and concentric to each other in this order. The master gear shaft 110 includes an attachment portion 110e and a tool lock portion 110i on the outer peripheral surface thereof. The attachment portion 110e includes a male threaded portion 110f, a centering portion 110g having a diameter less than that of the male threaded portion 110f, and a positioning surface 110h. The male threaded portion 110f functions as a right-handed screw.

Further, the master gear 111 includes a female threaded portion 111a and a centered portion 111b. The female threaded portion 111a is screwed onto the male threaded portion 110f. The axis of the centered portion 111b is appropriately aligned under the condition that the centered portion 111b makes contact with the centering portion 110g of the attachment portion 110e. Yet further, the master gear 111 includes the gear portion 111c, a tubular portion 111d, and a disc portion 111e. The gear portion 111c including face gear teeth is formed on the outer radial portion of the lateral surface of the master gear 111. The tubular portion 111d includes the female threaded portion 111a on the inner peripheral surface thereof. The disc portion 111e connects the tubular portion 111d and the gear portion 111c. The tubular portion 111d protrudes on the same side as the gear portion 111c. Further, the master gear 111 includes an abutment surface 111f between the female threaded portion 111a and the centered portion 111b. The abutment surface 111f is abutted to the positioning surface 110h for appropriately set the axial position of the master gear 111.

As illustrated in an enlarged view A of FIG. 5, an end surface 111g, which protrudes opposite to the abutment surface 111f in the axial direction of the female threaded portion 111a, includes an anti-rotation portion 111h. The anti-rotation portion 111h is formed by conducting clinching for the end surface 111g after the master gear assembly 109 is assembled. Specifically, the end surface 111g is pressed and deformed by a punch.

With the above structure and configuration, the present exemplary embodiment can achieve the same advantageous effects as those achieved by the aforementioned exemplary embodiment.

The centering portion may be herein disposed on the right side of the male threaded portion. In this case, the screw direction is decided based on the relative size relation between the diameter of the male threaded portion and that of the centering portion.

(b) In the aforementioned exemplary embodiment, the master gear is bonded to the master gear shaft by adhesive material and further fixed thereto by clinching for preventing rotation of the master gear. However, the master gear may be prevented from rotating by conducting either clinching or bonding with adhesive material. Alternatively, the anti-rotation portion may be a retainer member such as a retainer ring or a retainer pin without conducting clinching and bonding with adhesive material.

(c) In the aforementioned exemplary embodiment, the master gear shaft is entirely made of the same material. However, the attachment portion of the master gear shaft may be made of material different from that of the other portions of the master gear shaft by insert molding, for instance.

(d) In the aforementioned exemplary embodiment, the master gear shaft is made of stainless alloy. However, the master gear shaft may be made of aluminum alloy similarly to the master gear.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A spinning reel master gear assembly rotatably attachable to a reel unit of a spinning reel, the spinning reel master gear assemble comprising:
    a master gear shaft being rotatably attachable to the reel unit, the master gear shaft including an attachment portion, the attachment portion having a male threaded portion at least partially on an outer peripheral surface thereof; and
    a master gear fixed to the master gear shaft in an integrally rotatable state,
    the master gear including
        a hole at a center thereof to which the master gear shaft is inserted,
        a female threaded portion configured on an inner periphery of the hole, the female threaded portion screwed onto the male threaded portion, and
        a centered portion being centered by the attachment portion.

2. The spinning reel master gear assembly according to claim 1, wherein
    the attachment portion includes a centering portion having a diameter greater than a diameter of the male threaded portion,
    the centering portion is aligned with the male threaded portion in an axial direction,
    the centering portion is engaged with the centered portion for aligning an axis of the master gear,
    the attachment portion includes a positioning surface being disposed between the male threaded portion and the centering portion, where the positioning surface is disposed perpendicular to the axial direction,
    the centered portion is a centering hole contactable with an outer peripheral surface of the centering portion, and
    the master gear includes an abutment surface abutted to the positioning surface.

3. The spinning reel master gear assembly according to claim 1, further comprising
    an anti-rotation portion being configured to prevent the master gear from rotating with respect to the master gear shaft.

4. The spinning reel master gear assembly according to claim 3, wherein
    the master gear includes a gear portion formed on an outer radial portion of a lateral surface of the master gear,
    the gear portion having face gear teeth,
    the master gear includes a tubular portion including the female threaded portion on an inner peripheral surface thereof, and a disc portion connecting the tubular portion and the gear portion, and
    the anti-rotation portion is formed by swaging an end surface of the tubular portion, where the end surface is arranged in an axial direction of the female threaded portion.

5. The spinning reel master gear assembly according to claim 1, wherein
    both the male threaded portion and the female threaded portion are left-handed screws.

6. The spinning reel master gear assembly according to claim 1, wherein
    the master gear is fixed onto the master gear shaft by adhesive material.

* * * * *

UNITED STATES PATENT AND TRADEMARK OFFICE
CERTIFICATE OF CORRECTION

PATENT NO. : 8,430,349 B2
APPLICATION NO. : 13/023302
DATED : April 30, 2013
INVENTOR(S) : Yik Hui Chan et al.

Page 1 of 1

It is certified that error appears in the above-identified patent and that said Letters Patent is hereby corrected as shown below:

Title Page
Change

[73] Assignee: Shimano Inc., Osaka (JP)

to

-- [73] Assignee: Shimano Components (Malaysia) SDN. BHD., Johor (MY) --

Signed and Sealed this
Eighth Day of October, 2013

Teresa Stanek Rea
*Deputy Director of the United States Patent and Trademark Office*